United States Patent [19]
Kounoe et al.

[11] Patent Number: 5,577,962
[45] Date of Patent: Nov. 26, 1996

[54] VIRTUAL BULLET CHARGING DEVICE FOR GUN GAME MACHINE

[75] Inventors: Yutaka Kounoe; Yasushi Omori; Hideyuki Kikuchi, all of Tokyo, Japan

[73] Assignee: Namco Limited, Tokyo, Japan

[21] Appl. No.: 464,640

[22] PCT Filed: Nov. 10, 1994

[86] PCT No.: PCT/JP94/01895

§ 371 Date: Jun. 20, 1995

§ 102(e) Date: Jun. 20, 1995

[87] PCT Pub. No.: WO95/13850

PCT Pub. Date: May 26, 1995

[30] Foreign Application Priority Data

Nov. 13, 1993 [JP] Japan ............... 5-065464 U

[51] Int. Cl.[6] .................. A63F 9/02; F41J 5/02
[52] U.S. Cl. ............... 463/49; 446/473; 463/50; 463/51; 434/20; 434/21; 434/22
[58] Field of Search .............. 463/52, 51, 50, 463/49; 446/473, 405, 406, 407; 434/20, 21, 22, 18

[56] References Cited

U.S. PATENT DOCUMENTS

| | | | |
|---|---|---|---|
| 4,117,282 | 9/1978 | Ieda | 463/51 |
| 4,147,355 | 4/1979 | Barlow et al. | 463/52 |
| 4,223,376 | 9/1980 | Ikeda | 463/51 |

FOREIGN PATENT DOCUMENTS

| | | | |
|---|---|---|---|
| 39-19365 | 7/1964 | Japan . | |
| 63-108197 | 5/1988 | Japan . | |
| 2-185278 | 7/1990 | Japan . | |
| 2002482 | 11/1993 | Russian Federation | 446/473 |
| 820869 | 4/1981 | U.S.S.R. | 446/407 |

*Primary Examiner*—Benjamin H. Layno
*Attorney, Agent, or Firm*—Burns, Doane, Swecker & Mathis, LLP

[57] ABSTRACT

A gun game machine from where a player takes out and holds a model gun to play a game. When the number of operations of a trigger lever (6) attains the preset number of times, the game is stopped and, at the same time, a solenoid (20) operates to disengage a boss (23) of a lever (19) from a recess (22b) of a advance and retreat member (15) and the advance and retreat member is ejected down by the effect of a spring (24). When the player pushes up the advance and retreat member (15) to set, a sensor (16) detects the pushing action and resets the trigger count value for enabling the game to continue. The action of pushing up the advance and retreat device (15) is similar to the real action of loading a cartridge into a real gun and the player can enjoy a game having realism.

4 Claims, 3 Drawing Sheets

VIRTUAL BULLET CHARGING DEVICE FOR GUN GAME MACHINE

TECHNICAL FIELD

The present invention relates to an gun game machine wherein the player takes out a model gun away from an enclosure and holds it by hand to play a game and, more particularly, a virtual bullet charging device to realize an imaginary charging of bullets into the model gun.

BACKGROUND ART

In prior art, a machine as illustrated for example in FIG. 3 is known as game machine in which the player takes out a gun model away from a casing of a game machine to play a game. This game machine includes a game machine casing 2 which comprises a built-in monitor 1 which displays a sequence of images changing according to an appropriate story. Two gun stands 4 are arranged on a front control panel 3 of the machine casing 2 and each gun stand 4 receives, respectively, one model gun 5.

Before playing a game, the player removes the model gun 5 from the gun stand and holds the model gun in his hand away from the machine casing. When the game begins, the monitor 1 displays predetermined images and the player pulls a trigger lever 6 of the gun model aiming at the shooting target within the displayed images. According to a judgment procedure belonging to a prior art well-known as itself, when the model gun 5 is judged to have shot the target precisely, the score shown in a score indication space displayed at a predetermined place within the monitor 1 will be increased.

As for real gums, as it is well-known, the number of bullets which can be loaded in them is limited to a certain quantity and it is necessary to load bullets when the number of bullets are fired. The conventional game machine is designed to oblige, usually, the player to simulate the action similar to the loading of bullets. For example, upon the completion of predetermined number of times of pulling the trigger lever 6 of the model gun 5, the subsequent pulling operation of the trigger lever 6 will makes no contribution to the progression of the game. Further, if the player wants to continue the game, the player is obliged to perform a convenient virtual loading action.

As such a virtual loading action, in the prior art, it is proposed to afford again the player a certain number, approximately 6 times, of trigger lever action if he had directed a light receiving portion provided at the tip of the model gun away from the monitor 1 and pulled once the trigger lever 6 in this state. Such a virtual loading action of the prior art, however, can not give the player a real feeling of loading bullets into the model gun and does not have realism.

The object of the present invention is to overcome the problems mentioned hereinbefore and to provide a very real feeling of loading action with a gun game machine wherein the player holds a model gun away from its casing.

DISCLOSURE OF INVENTION

The virtual bullet loading device of the present invention relates to a virtual bullet loading device for a gun game machine in which the player takes out and holds a model gun away from a machine casing, comprising an advance and retreat member disposed at the bottom of the model gun and a loading detection sensor for detecting the shift of the advance and retreat member. The advance and retreat member steps back and forth between the forward position where it is advanced into the model gun and the backward position where it is remote from the model gun. Additionally, the loading detection sensor is designed to detect the shift of the advance and retreat member between its forward position and backward position.

The loading detection sensor may be constituted by a mechanical sensor such as a microswitch, a photoelectric sensor such as a photoswitch or a detecting element of any other type.

The advance and retreat member may be designed to normally stay in its backward position forced resiliently by the effect of a resilient force providing device such as a spring. Alternatively, an advance and retreat member holding device may be provided for fixing and holding the advance and retreat member selectively in its forward position or backward position to announce the need of virtual bullet loading action to the player by shifting the advance and retreat member from its forward position to its backward position when the trigger lever is pulled the predetermined number of times. Moreover, a click feeling providing device may be arranged for affording the advance and retreat member a click impact when the same is shifted from the backward position to the forward position.

The player holds the model gun in his hand and pulls the trigger lever aiming at the shooting target on the monitor. If the tip of the model gun is directed precisely to the shooting target when the trigger lever is pulled, it will be judged that the target will have been shot precisely by the model gun and the game progression for showing an on-target impact, for example an increment of the game score, will be performed. If the model gun tip is not directed precisely to the shooting target when the trigger lever is pulled, it will be judged to have shot a spot other than the shooting target by mistake and a missed shot scene shall be represented.

The number of times of consecutive operation of the trigger lever which is afforded to the player is preset to a certain number of times, approximately 6 times for example, and it is necessary to perform a virtual bullet loading action when the number of operations attains the preset number. Then the player push up the advance and retreat member provided at the bottom of the model gun from the underside to push it into the inside of the model gun. When the same is pushed into the model gun, a loading detection sensor detects the pushing action and generates a signal, the output signal resets the number of times of trigger lever operation to its initial value for permitting the player to pull again the trigger lever the preset number of times. The action of pushing up the advance and retreat member into the inside of the model gun is similar to the real action of loading a cartridge into a real gun for supplying bullets and the player can enjoy a game having realism.

According to the virtual bullet loading device of the present invention, the game proceeds by pushing the advance and retreat member into the model gun to imitate the real cartridge loading action each time the trigger lever will be pulled the preset number of times in a manner to afford the player a virtual bullet loading feeling having realism as for bullet charging action.

BEST MODE FOR CARRYING OUT THE INVENTION (EXAMPLE 1)

Now the invention will be described more in detail referring to the accompanied drawings.

Figure 1:
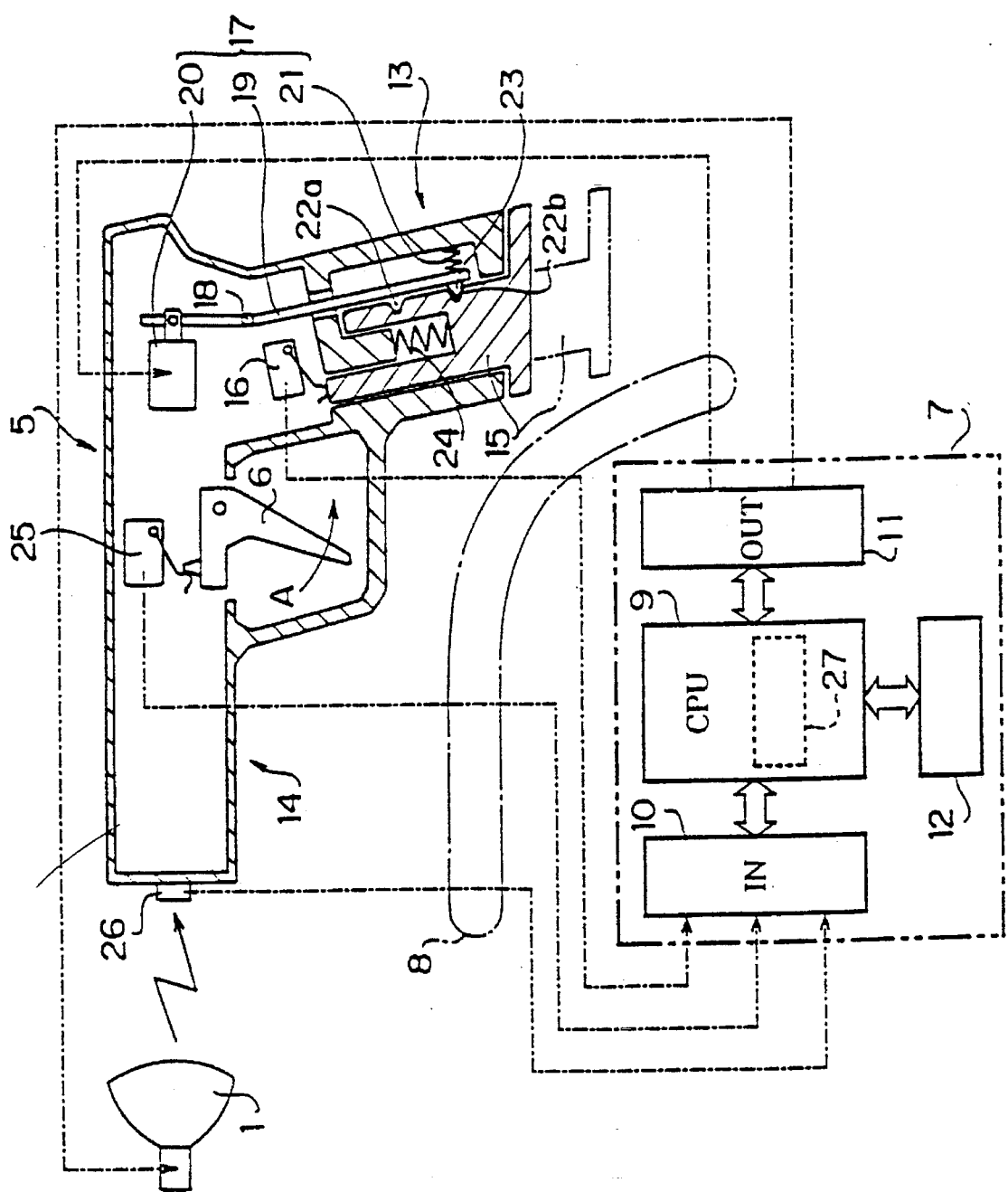
FIG. 1 is a schematic view illustrating an embodiment of the virtual bullet loading device for the gun game machine of the present invention.
Figure 3:
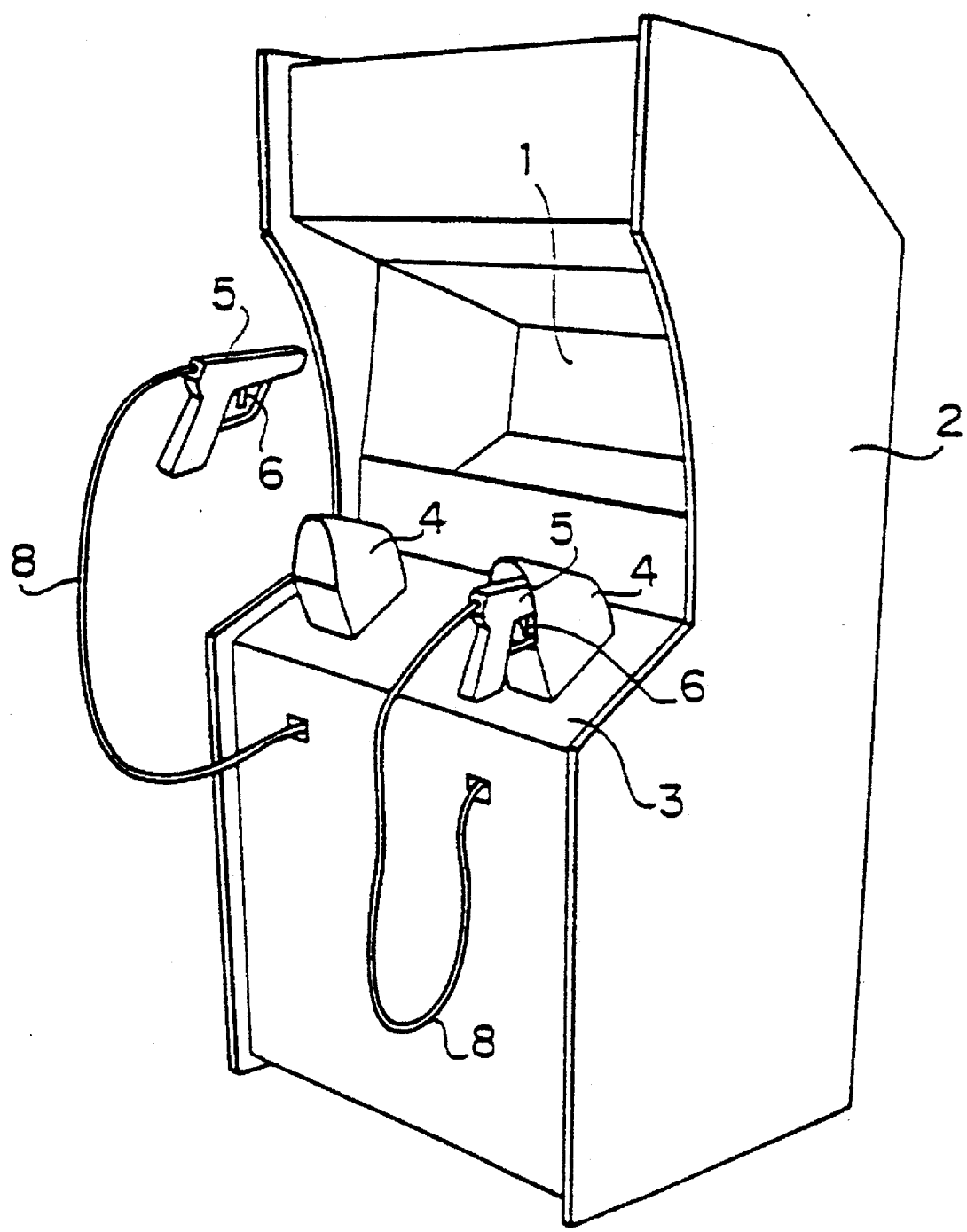
FIG. 3 is a perspective view of an example of the gun game machine to which the virtual bullet loading device of the present invention can be applied.

FIG. 1 shows an embodiment wherein the virtual bullet loading device of the present invention is applied to the gun game machine shown in FIG. 3. A monitor 1 and a computer 7 shown in FIG. 1 are arranged in a machine casing 2 of the game machine shown in FIG. 3 and various electric apparatus in a model gun 5 are coupled to the computer 7 through an electric communication line 8. The computer 7 comprises, as it is well-known in the art, a CPU 9, an input interface 10, an output interface 11 and a memory 12.

The model gun 5 comprises a grip 13 and a gun body 14 to imitate a real gun and the inside of the grip 13 contains the following elements: an advance and retreat member 15 preferably reproducing the shape of a cartridge, a loading detection sensor 16 constituted by, for example, a microswitch and a device 17 for holding the advance and retreat member 15. The advance and retreat member holding device 17 comprises a lever 19 for pivoting about a pin 18, an electromagnetic solenoid 20 for urging the lever 19 and a compression spring 21 for biasing the lever 19 to the left of the figure. This advance and retreat member holding device 17 serves both as an advance and retreat member holding means for maintaining the advance and retreat member 15 and as a click feeling affording means to provide a click impact to the advance and retreat member 15.

On the right side of the advance and retreat member 15 are formed two wedge-form recesses 22a and 22b with one of which engages a wedge-form boss 23 disposed at the lower end of the lever 19. In the figure, the boss 23 engages with the lower recess 22b and, in this state, the advance and retreat member 15 is maintained at its forward position (shown by the solid line) inside the model gun 5. On the other hand, when the boss 23 engages with the upper recess 22a, the advance and retreat member 15 is maintained at its backward position (shown by the chain line) remote downward from the model gun 5. The advance and retreat member 15 is elastically urged by a compression spring 24 in the downward direction, or in the direction from the forward position toward the backward position.

A trigger sensor 25 composed of a microswitch is arranged in the gun body 14 and the trigger sensor 25 is turned ON when a trigger lever 6 is pulled in the direction of the arrow A. A photo sensor 26 is attached to the tip of the gun body 14 for detecting the shooting target displayed on the monitor 1.

Now the function of the virtual bullet loading device composed as mentioned above will be described.

In FIG. 1, a sequence of images representing a game story is displayed on the monitor 1 through raster scan according to the game story stored in the memory 12 in the computer 7. The game story contains shooting targets. The player aims at the shooting target for directing the tip of the model gun and pulls the trigger lever 6. When he pulls out the trigger lever 6, the monitor 1 displays a white screen instantaneously to detect the shot position. That is, the monitor 1 flashes instantaneously. Since this white screen is realized by a raster scan beginning from the upper left corner of the monitor 1, when a raster light appears at a position of coordinates, the photosensor 26 detects the light and by reading the raster scan ordinate and abscissa at this time, the position to which the photosensor is directed, namely the position hit by the model gun 5 will be detected as a position of coordinates. The CPU 9 determines if this hit position corresponds to the shooting target and if the result is affirmative, the computer will represent a scene of good hit by, for example, increasing the game score, and if it is negative, the CPU 9 judges that the shooting target is not hit precisely and represents a scene of a missed shot.

The CPU 9 renews the count value of a counter 27 each time it receives a detection signal from a trigger detection sensor 25 and turns on a solenoid 20 instantaneously when the renewed values reaches the preset value, for example 6 times. At the same time, it stops temporarily the progress of the game. For example, a subsequent pulling operation of the trigger lever 6 is judged invalid to be excluded from the judgment of whether the shooting target is hit or not. When the solenoid 20 is turned on instantaneously, the lever 19 turns a little counterclockwise to disengage the boss 23 and the lower recess 22b of the advance and retreat member 15 for ejecting the advance and retreat member 15 to the backward position (shown by the chain line) by the force of a spring 24.

Confirming this ejection by sight or hand feeling, the player notices that the number of operations of the trigger lever 6 has attained the preset number of times and in response to this, he resets the advance and retreat member 15 to its forward position (shown by the solid line) by pushing up its bottom. When the advance and retreat member 15 is reset to its forward position, the loading detection sensor 16 detects this reset action and generates a detection signal to be received by the CPU 9 which will reset the counter 27 to enable the game to continue. In this way, each time the number of operations of the trigger lever 6 reaches the preset number of times, the player pushes up the advance and retreat member 15 to its forward position to continue the game. The action of pushing up the advance and retreat member 15 to its forward position being similar to that of loading a cartridge into a real gun, the player can enjoy a game having realism.

The loading detection sensor 16 and the trigger detection sensor 25 may be constituted by photosensors or by any other type of detection element other than microswitch.

Moreover, when the advance and retreat member 15 is set to its forward position, the boss 23 rushes rapidly into the lower recess 22b of the advance and retreat member 15 according to the force of the spring 21 for generating a relatively light impact. This impact will be felt as a click by the player and create realism of loading a cartridge into a real gun.

(EXAMPLE 2)

Figure 2:
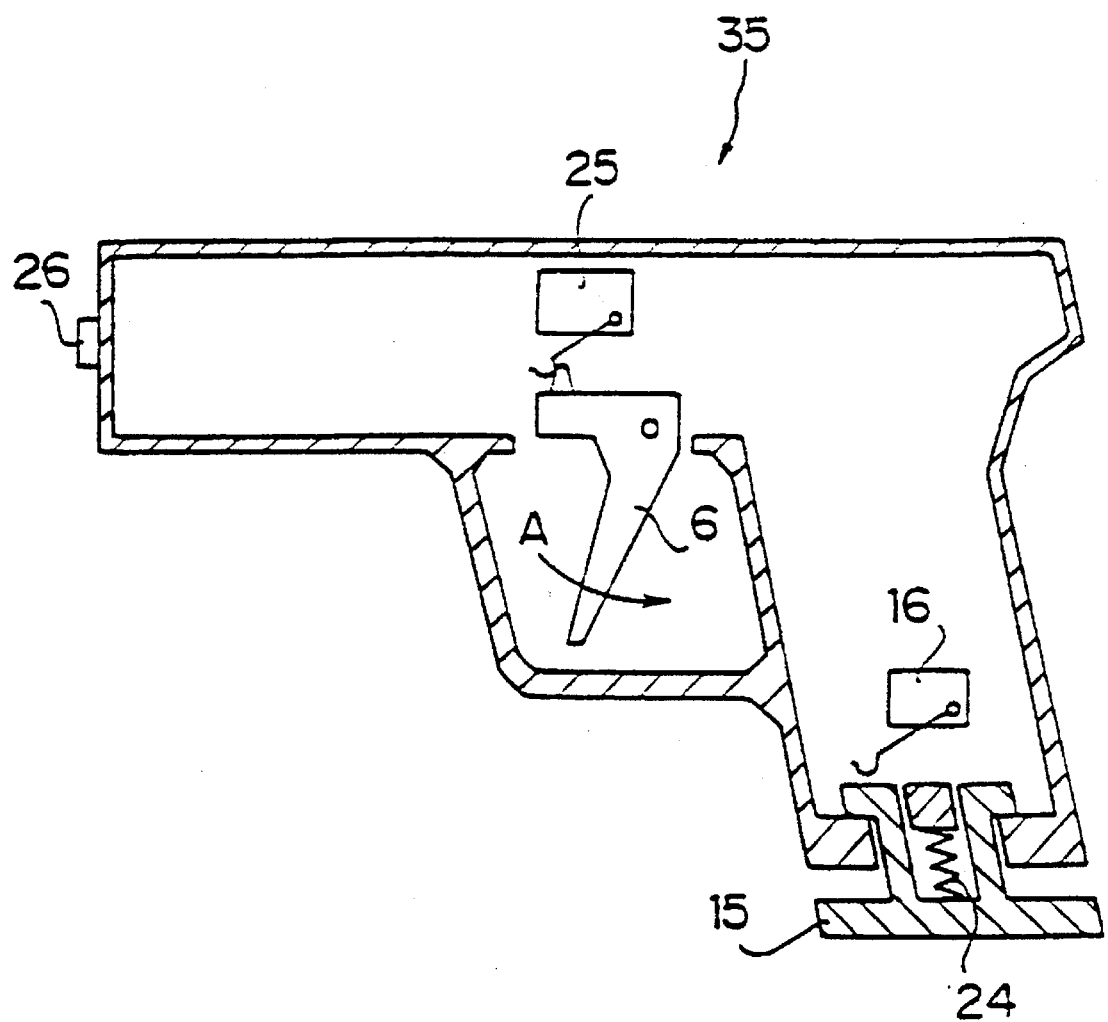
FIG. 2 is a side cross-section of another embodiment of the virtual bullet loading device for the gun game machine of the present invention.

FIG. 2 illustrates another embodiment of the virtual bullet loading device for gun game machine of the present invention. The device is similar to that of FIG. 1 except that the advance and retreat member holding device 17 is omitted. Similar members in FIG. 1 and FIG. 2 are referred by the same number and, therefore, their description will be omitted.

In the virtual bullet loading device of this embodiment, an advance and retreat member 15 is normally maintained at its backward position away from a model gun 35 by the force of a spring 24. As in the embodiment of FIG. 1, when the number of operations of the trigger lever 6 has attained the preset number of times, the player resets the advance and retreat member 15 to its forward position by pushing up its bottom. When a loading detection sensor 16 detects this pushing up action, a counter for counting the trigger operation is set to enable the game to continue.

While the present invention has been described with respect to preferred embodiments thereof, it will be understood that they do not limit the invention and that variations and modifications may be effected within the scope and spirit of the invention which is defined in the following claims.

For example, the virtual bullet loading device of the present invention can be applied not only to gun game machines of the construction shown in FIG. 3 but also to those of various other construction. Also, the method for detecting the shooting target displayed on the monitor is not limited to the one using a photosensor described above. The advance and retreat member holding mechanism for maintaining the advance and retreat member 15 in its either forward or backward position and the mechanism for affording the advance and retreat member a click feeling are also not limited to the advance and retreat member holding device 17 illustrated in FIG. 1. For example, it is also possible to make the advance and retreat member 15 fall down to the backward position by its own weight.

INDUSTRIAL APPLICABILITY

The virtual bullet loading device of the present invention can be advantageously applied to game machines for business use and more particularly, to gun game machines.

We claim:

1. A virtual bullet loading device used in a gun game machine wherein a player takes out and holds a model gun away from a game machine casing, comprising:

an advance and retreat member which is disposed at the bottom of the model gun and moves back and forth between a forward position where said member is advanced into the model gun and a backward position where said member is remote from the model gun and a loading detection sensor for detecting shift of said advance and retreat member between said forward position and said backward position.

2. A virtual bullet loading device used in a gun game machine as claimed in claim 1 wherein the advance and retreat member is biased resiliently to normally stay in said backward position.

3. A virtual bullet loading device used in a gun game machine as claimed in claim 1, further comprising an advance and retreat member holding device for fixing and holding the advance and retreat member selectively in its forward position or backward position.

4. A virtual bullet loading device used in a gun game machine as claimed in any one of claims 1–3, further comprising a click feeling providing device for giving the advance and retreat member a click impact when the advance and retreat member is shifted from the backward position to the forward position.

* * * * *